(12) United States Patent
Song et al.

(10) Patent No.: US 8,918,948 B2
(45) Date of Patent: Dec. 30, 2014

(54) WIPER DEVICE

(75) Inventors: Kyoung-Joon Song, Daegu (KR); Sang-Cheol Lee, Daegu (KR)

(73) Assignee: Cap Corporation (KR)

( * ) Notice: Subject to any disclaimer, the term of this patent is extended or adjusted under 35 U.S.C. 154(b) by 0 days.

(21) Appl. No.: 13/496,881

(22) PCT Filed: Apr. 8, 2011

(86) PCT No.: PCT/KR2011/002484
§ 371 (c)(1),
(2), (4) Date: Mar. 17, 2012

(87) PCT Pub. No.: WO2011/142538
PCT Pub. Date: Nov. 17, 2011

(65) Prior Publication Data
US 2012/0167328 A1 Jul. 5, 2012

(30) Foreign Application Priority Data
May 12, 2010 (KR) .................. 10-2010-0044562

(51) Int. Cl.
*B60S 1/46* (2006.01)
*B60S 1/38* (2006.01)
*B60S 1/40* (2006.01)

(52) U.S. Cl.
CPC ............. *B60S 1/3801* (2013.01); *B60S 1/3806* (2013.01); *B60S 1/4006* (2013.01)
USPC ................... 15/250.32; 15/250.44; 15/250.46; 15/250.454; 15/250.361; 15/250.453

(58) Field of Classification Search
USPC ............... 15/250.32, 250.44, 250.46, 250.47, 15/250.201, 250.451, 250.452, 250.453, 15/250.454, 250.361, 250.42
See application file for complete search history.

(56) References Cited

U.S. PATENT DOCUMENTS 3,854,161 A * 12/1974 Benson ...................... 15/250.04
5,325,563 A * 7/1994 Cayan ........................ 15/250.46

(Continued)

FOREIGN PATENT DOCUMENTS

JP 2005075050 3/2005
JP 2007015636 1/2007

(Continued)

OTHER PUBLICATIONS

International Search Report for PCT/KR2011/002484, English translation attached to original, Both completed by the Korean Patent Office on Dec. 28, 2011, All together 5 Pages.
Korean Office Action for KR10-2010-0044562, Issued Date of Korean Office Action Oct. 5, 2012, English translation attached to original, All together 7 Pages.

*Primary Examiner* — Monica Carter
*Assistant Examiner* — Michael Jennings
(74) *Attorney, Agent, or Firm* — Brooks Kushman P.C.

(57) ABSTRACT

The wiper device for removing foreign substances that are stuck on a windshield can include: a lever assembly, having a plurality of levers in a tournament type coupled thereto; a contact member, being supported by the lever assembly and formed in the shape of a blade in close contact with the windshield so as to wipe out the foreign substances; and a cover member, provided in a plurality, each being coupled to the lever connecting a corresponding joint of the lever assembly. Accordingly, the parts of the lever assembly having the multi joint structure are effectively covered by the plurality of cover members, allowing for a simple appearance, and since each cover member is coupled with a corresponding lever and moves with the corresponding lever in an integrated manner, it becomes possible to prevent the levers from being exposed to an outside even while the wiper device is activated.

2 Claims, 5 Drawing Sheets

(56) References Cited

U.S. PATENT DOCUMENTS

| | | | | |
|---|---|---|---|---|
| 5,383,249 | A * | 1/1995 | Yang | 15/250.201 |
| 5,546,627 | A * | 8/1996 | Chen | 15/250.39 |
| 6,336,243 | B1 * | 1/2002 | Charng | 15/250.201 |
| 7,636,980 | B2 * | 12/2009 | Nakano | 15/250.201 |
| 7,836,541 | B2 * | 11/2010 | Harita et al. | 15/250.04 |
| 7,921,504 | B1 * | 4/2011 | Chiang | 15/250.46 |
| 8,104,137 | B2 * | 1/2012 | An et al. | 15/250.46 |
| 2007/0157411 | A1 * | 7/2007 | Okura | 15/250.32 |
| 2010/0281645 | A1 * | 11/2010 | Kim et al. | 15/250.32 |

FOREIGN PATENT DOCUMENTS

| | | |
|---|---|---|
| JP | 2008254585 | 10/2008 |
| KR | 2019920015023 | 8/1992 |
| KR | 20080102564 | 11/2008 |
| KR | 100937206 | 1/2010 |

* cited by examiner

WIPER DEVICE

CROSS-REFERENCE TO RELATED APPLICATION

This application is the U.S. national phase of PCT Appln. No. PCT/KR/2011/002484 filed Apr. 8, 2011, which claims priority to KR application 10-2010-0044562 filed on May 12, 2010 the disclosures of which are incorporated in their entirety by reference herein.

BACKGROUND OF THE INVENTION

1. Technical Field

The present invention is related to a wiper device.

2. Background Art

Generally, visibility is interfered and safety is compromised if the windshield of a motor vehicle that is in motion is contaminated by the dust or various foreign substances in the air or the rain or snow due to weather conditions. Accordingly, motor vehicles are equipped with a wiper device for wiping out the rain, snow or other foreign substances from the windshield in order to secure the visibility for safe driving of the driver.

One of various types of wiper devices is a tournament structure of wiper device, which has multiple layers of levers, end of each lever supporting the blade.

In the tournament structure of wiper device, a plurality of levers are connected by use of a number of joints, which are difficult to be covered entirely during the activation of the wiper device. Accordingly, the joints of the tournament structure are exposed and can be corroded by the rain or snow, or even can be frozen during the winter.

In addition, since the tournament structure is constructed with multiple layers of levers, the appearance is not very attractive.

SUMMARY OF THE INVENTION

The present invention provides a wiper device that can cover the multi joint structure effectively and have an attractive appearance.

An aspect of the present invention features a wiper device for removing foreign substances that are stuck on a windshield. The wiper device in accordance with an embodiment of the present invention can include: a lever assembly, having a plurality of levers in a tournament type coupled thereto; a contact member, being supported by the lever assembly and formed in the shape of a blade in close contact with the windshield so as to wipe out the foreign substances; and a cover member, provided in a plurality, each being coupled to the lever connecting a corresponding joint of the lever assembly.

The lever assembly can include: a frame; a first lever, provided in a pair, each being hinge-coupled to either end of the frame; and a second lever, provided in a pair, each being hinge-coupled to an outside end of the first lever. The contact member can be supported by an inside end of the first lever and both end portions of the second lever.

The cover assembly can include: a center cover, coupled to the frame and covering the frame and portions of the first levers arranged underneath the frame; a first extension cover, provided in a pair, each being coupled to the first lever and covering the remaining portion of the first lever and a portion of the second lever arranged underneath the first lever; and a second extension covers, provided in a pair, each being coupled to the second lever and covering the remaining portion of the second lever.

The cover assembly can have concave spoiler portions formed on one lateral side thereof in such a way that the cover assembly and the lever assembly coupled with the cover assembly are pressed toward the windshield by receiving a wind.

DETAILED DESCRIPTION OF THE INVENTION

Hereinafter, an embodiment of the present invention will be described with reference to the accompanying drawings.

Figure 1:
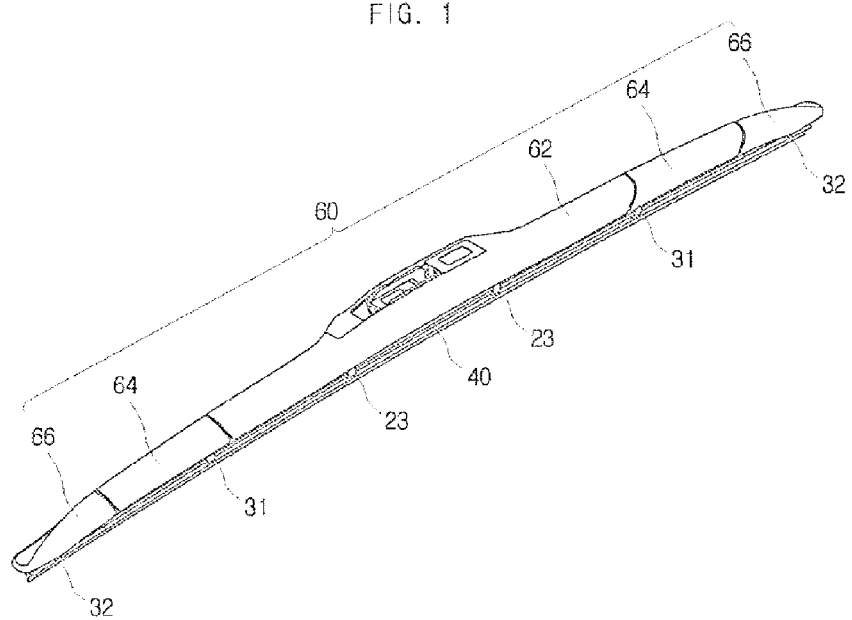
FIGS. 1 and 2 are perspective views showing a wiper device in accordance with an embodiment of the present invention.
Figure 2:
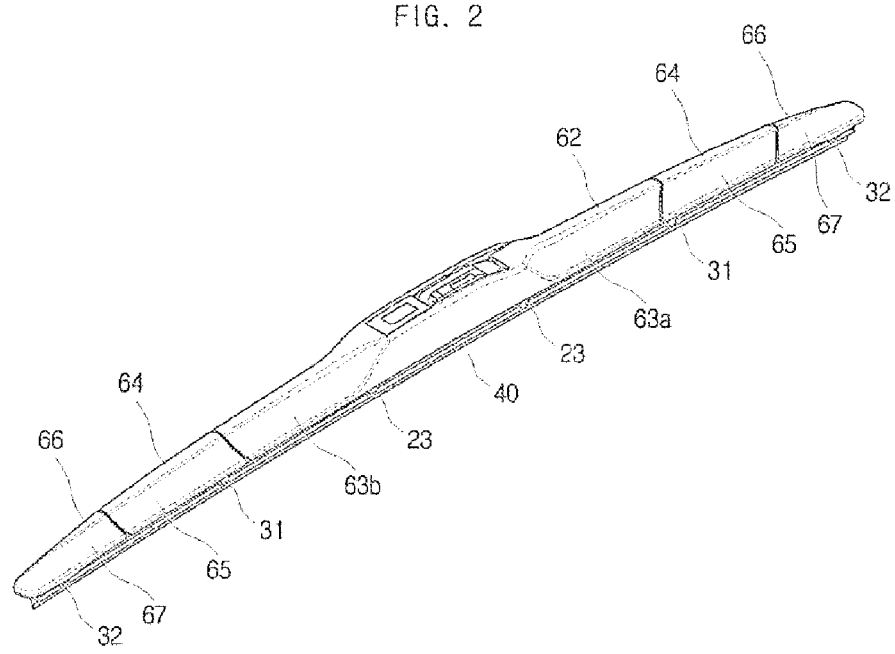
Figure 3:
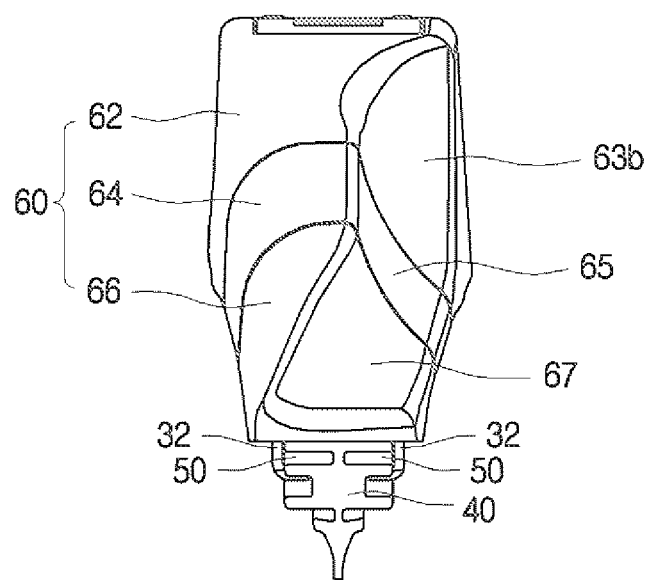
FIG. 3 is a side view showing the wiper device in accordance with an embodiment of the present invention.
Figure 4:
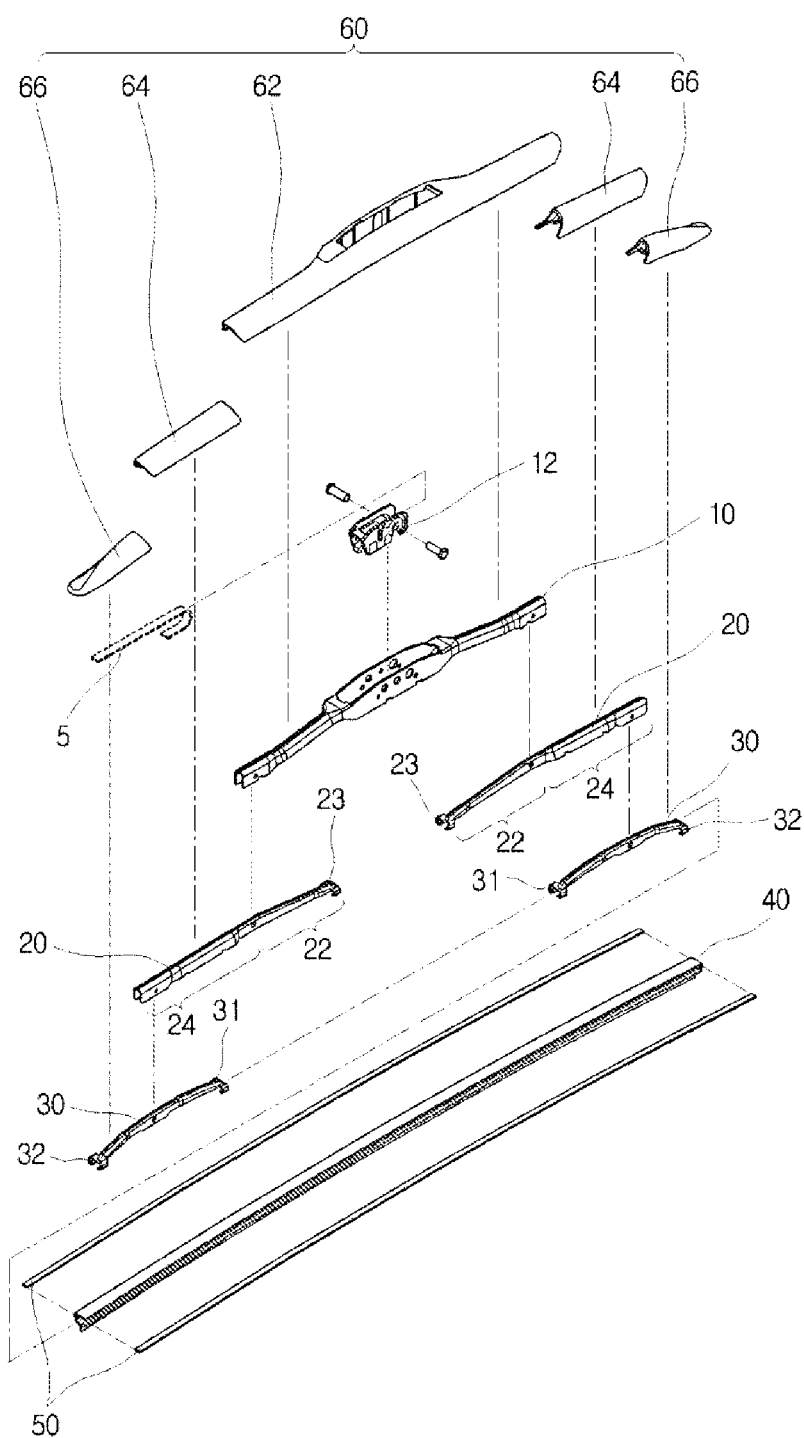
FIG. 4 is an exploded perspective view showing the wiper device in accordance with an embodiment of the present invention.

FIGS. 1 and 2 are perspective views showing a wiper device in accordance with an embodiment of the present invention, FIG. 3 is a side view showing the wiper device in accordance with an embodiment of the present invention. FIG. 4 is an exploded perspective view showing the wiper device in accordance with an embodiment of the present invention.

The wiper device in accordance with an embodiment of the present invention is a device for removing foreign substances that are stuck on a windshield of, for example, a motor vehicle and includes a lever assembly, a contact member 40 and a cover assembly 60.

In the wiper device according to the present embodiment, a tournament type of lever assembly, which is constituted with a plurality of levers, is effectively covered by a plurality of cover members and features a simple external appearance. Particularly, as each cover member is coupled with a corresponding lever and moves with the corresponding lever in an integrated manner, it becomes possible to prevent the levers from being exposed to an outside even while the wiper device is activated.

The lever assembly, which is a part that supports the contact member 40, encompasses the plurality of levers in a tournament form to support the contact member 40 evenly and secure surface compliance of the contact member 40.

Specifically, the lever assembly of the present embodiment can include a frame 10, a pair of first levers 20 and a pair of second levers 30.

The frame 10 is a central part of the tournament type of lever assembly. That is, the first lever 20 and the second lever 30 can be successively coupled to both ends of the frame 10. Also, a wiper arm 5, or the like, which is for driving the wiper device, can be connected to the frame 10. For this, an adaptor 12, which is coupled to the wiper arm 5, can be coupled to the wiper device.

A pair of the first levers 20 are hinge-coupled to either end of the frame 10 to support the second levers 30 and the contact member 40. For this, the first lever 20 has an outside arm 24 for supporting the second lever 30 and an inside arm 22 for supporting the contact member 40.

In addition, the second lever 30 is hinge-coupled to an end portion of the outside arm 24 of the first lever 20 to support the contact member 40.

Accordingly, the contact member 40 is supported evenly by both end portions of the second lever 30 as well as an end portion of the inside arm 22 of the first lever 20, thereby improving the surface compliance. That is, the lever assembly of the present embodiment is possible to support the entire contact member 40 with uniform pressure through a six-point support.

The contact member 40, which is a part that is in close contact with the windshield and wipes out foreign substances, is formed in the shape of a blade and is supported by an end part 23 of the inside arm 22 of the first lever 20 and both end portions 31, 32 of the second lever 30. The contact member 40 of the present embodiment can be any kind of conventional contact member, for example, the rubber-made wiper.

Here, the wiper device in accordance with the present embodiment can additionally include an elastic member 50 that is extended in a lengthwise direction of the contact member 40 and elastically supports the contact member 40 in such a way that the contact member 40 can be in a better contact with the windshield.

Specifically, in the present embodiment, opposite-side lateral surfaces of the contact member 40 can be formed with a pair of installation grooves, respectively, in the lengthwise direction of the contact member 40, and a pair of rail springs, which are the elastic member 50, can be inserted in the installation grooves, respectively. The elastic member 50 is not restricted to what is described herein but can be embodied in various forms, for example, a body spring, as long as it can elastically support a back side of the contact member 40.

The cover assembly 60 is a part that covers the tournament type of lever assembly, which is in a multi joint structure. When the levers fluctuate at joints of the lever assembly, the cover members constituting the cover assembly 60 move together with the levers and prevent the levers from being exposed to the outside.

Specifically, each lever that connects the joints is coupled by the corresponding cover member, which moves together with the lever to cover the lever at all times. Accordingly, the parts of the lever assembly having the multi joint structure are effectively covered by the plurality of cover members, and thus the levers and the joints that connect the levers can be prevented from being exposed to the outside. As a result, the joints of the lever assembly can be prevented from being corroded or frozen due to exposure to the rain or snow. In addition, since the multi-layer lever structure is not exposed to the outside, it is possible for the wiper device to maintain a simple external appearance.

As described above, the lever assembly of the present embodiment is constituted by including the frame, a pair of the first levers and a pair of the second levers. Accordingly, the cover assembly 60 of the present embodiment is constituted by including a center cover 62, a pair of first extension covers 64 and a pair of second extension covers 66 that correspond to the lever assembly.

Figure 5:
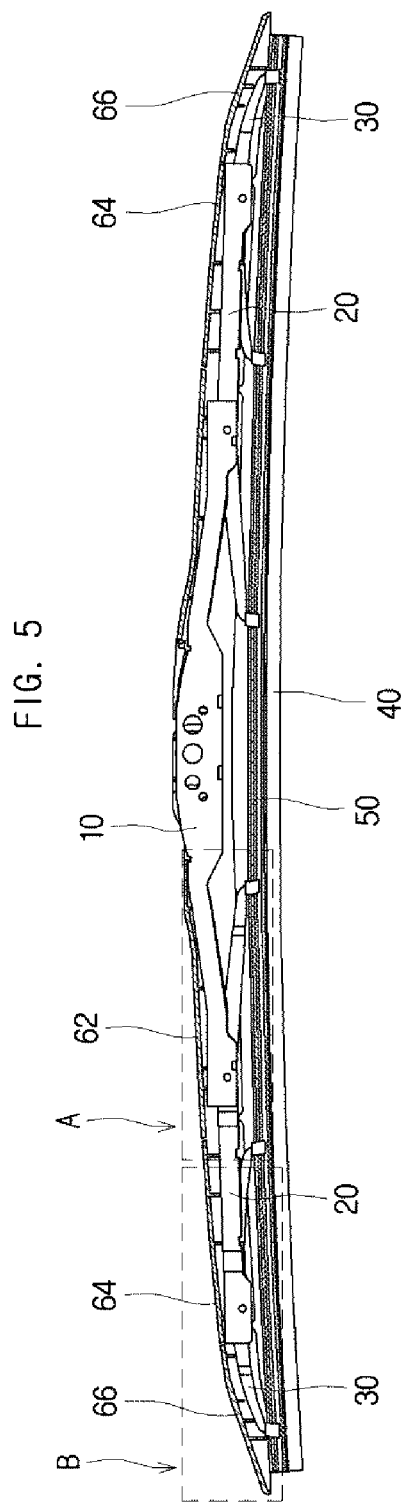
FIGS. 5 to 7 are cross-sectional views showing the wiper device in accordance with an embodiment of the present invention.
Figure 6:
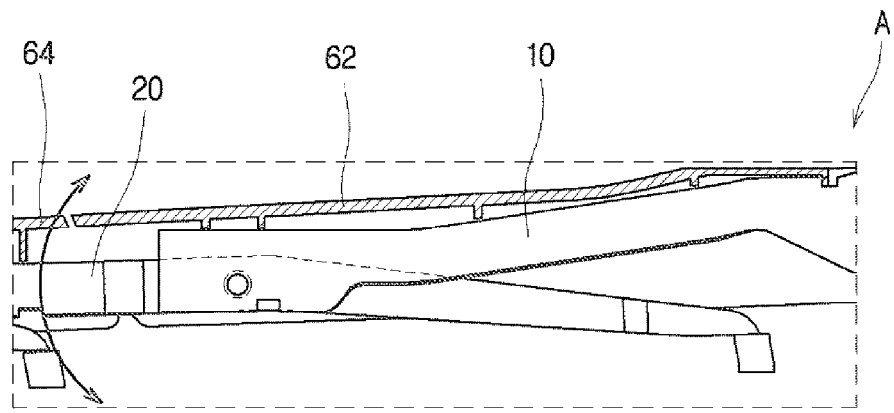
Figure 7:
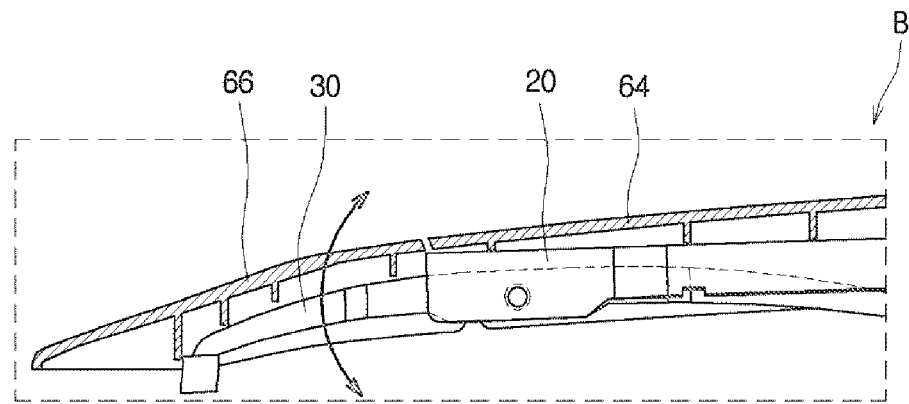

FIGS. 5 to 7 are cross-sectional views showing the wiper device in accordance with an embodiment of the present invention.

As shown in FIG. 5, the center cover 62 of the present embodiment is coupled to the frame 10 and covers the frame 10, the inside arms 22 of the first levers 20, which are arranged underneath the frame 10, and joints that hinge-couple the frame 10 with the first levers 20. Each of the first extension covers 64 is coupled to the outside arm 24 of the first lever 20 and covers the outside arm 24, a portion of the second lever 30, which is arranged underneath the first lever 20, and a joint that hinge-couples the first lever 20 with the second lever 30. Each of the second extension covers 66 is coupled to the second lever 30 and covers the remaining portion of the second cover 30.

Accordingly, as shown in FIG. 6, since the first extension cover 64 coupled to the first lever 20 fluctuates in an integrated manner with the fluctuation of the first lever 20, the first lever 20 and the second lever 30, which is underneath the first lever 20, are prevented from being exposed when the wiper device is activated.

Moreover, as shown in FIG. 7, the second extension cover 66 coupled to the second lever 30 fluctuates in an integrated manner with the fluctuation of the second lever 30, the second lever 30 can be prevented from being exposed.

Therefore, the covers of the cover assembly 60 can protect their corresponding levers and joints that connect the levers from the rain or snow, preventing the wiper device from deterioration of cleaning quality due to corrosion or freezing.

The cover assembly 60 of the present embodiment can also function as a spoiler that can keep the wiper device from levitating while the motor vehicle is driven. Specifically, by receiving a wind that works like the headwind while the motor vehicle is moving forward, the cover assembly 60 and the lever assembly coupled with the cover assembly 60 can be pressed toward the windshield of the motor vehicle. For this, one lateral side of the cover assembly 60 can be formed with concave spoiler portions.

As shown in FIGS. 2 and 3, the wiper device of the present embodiment has the spoiler portions 63a, 63b, 65, 67, which are in concave shapes to take the wind, formed on either side of the center cover 62, the first extension cover 64 and the second extension cover 64, respectively.

Although an embodiment of the present invention has been described, it shall be appreciated that various permutations and modifications are possible by those of ordinary skill in the art to which the present invention pertains without departing from the technical ideas and scopes of the present invention that are defined by the claims appended below.

It shall be also appreciated that there can be many other embodiments than the embodiment described above in the claims of the present invention.

What is claimed is:

1. A wiper device for removing foreign substances that are stuck on a windshield, comprising:
    a lever assembly, comprising a frame, a pair of first levers hinge-coupled to either end of the frame, respectively, and a pair of second levers hinge-coupled to outside ends of the first lever, respectively;
    a contact member, being supported by an inside ends of the first levers and both end portions of the second levers and formed in the shape of a blade in close contact with the windshield so as to wipe out the foreign substances; and
    a cover assembly, comprising: a center cover, coupled to the frame and covering an entire upper portion and all of each opposing side portion of the frame and inside arms of the first levers arranged underneath the frame; a pair of first extension covers coupled to the pair of first levers, respectively, and covering an entire upper portion and all of each opposing side portion of outside arms of the first levers and portions of the second levers arranged underneath the first levers; and a pair of second extension covers coupled to the pair of second levers, respectively, and covering an entire upper portion and all of each opposing side portion of remaining portions of the second levers.

2. The wiper device of claim 1, wherein the cover assembly has concave spoiler portions formed on one lateral side thereof in such a way that the cover assembly and the lever assembly coupled with the cover assembly are pressed toward the windshield by receiving a wind.

\* \* \* \* \*